INVENTOR.
Van William McKnab

March 23, 1965 V. W. McKNAB 3,174,264
DIRT SEPARATOR FOR SUCTION CLEANERS
Filed Feb. 25, 1963 2 Sheets-Sheet 2

INVENTOR.
Van William McKnab
BY
Fishburn and Gold
ATTORNEYS

United States Patent Office 3,174,264
Patented Mar. 23, 1965

3,174,264
DIRT SEPARATOR FOR SUCTION CLEANERS
Van William McKnab, Ponca City, Okla., assignor to Vacu-Maid, Inc., Ponca City, Okla., a corporation of Oklahoma
Filed Feb. 25, 1963, Ser. No. 260,625
8 Claims. (Cl. 55—317)

This invention relates to suction cleaners for cleaning rooms and buildings where dirt, dust and the like are conveyed by suction to a central separating and dirt-collecting station from which air is discharged exteriorly of the building, and more particularly to a dirt separator for such suction cleaners.

In central cleaning systems of the suction or vacuum types, ducts extend through walls of a building from the various rooms to a central dirt-collecting station and, when a room is to be cleaned, a suction cleaning implement is connected by a flexible hose to an inlet of a duct leading to said room and a suction apparatus draws air through the cleaning implement and conveys dirt, dust and the like therewith to a dirt separator chamber. The air is usually drawn from the separator chamber through a screen by the suction apparatus and is discharged exteriorly of the building. Relatively lightweight items which are too large to pass through the screen are frequently drawn through the ducts to the separator chamber and collect on the screen and also small particles may be drawn through the screen and discharged exteriorly of the separator to settle on surrounding areas.

The principal objects of the present invention are to provide a dirt separator for suction cleaners that eliminates the above difficulties; to provide a dirt separator wherein air flow into the separator provides a centrifugal action that causes large heavier particles to drop from the airstream into a dirt-collecting chamber; to provide such a dirt separator with a power-driven rotor adjacent an inlet passage to a suction member to provide an air flow and centrifugal action for effecting separation of small particles from the airstream passing into the air passage to the suction member; and to provide a dirt separator that is economical to manufacture, efficient in operation and easily maintained.

Other objects and advantages of this invention will become apparent from the following description taken in connection with the accompanying drawings wherein are set forth by way of illustration and example certain embodiments of this invention.

Figure 1:
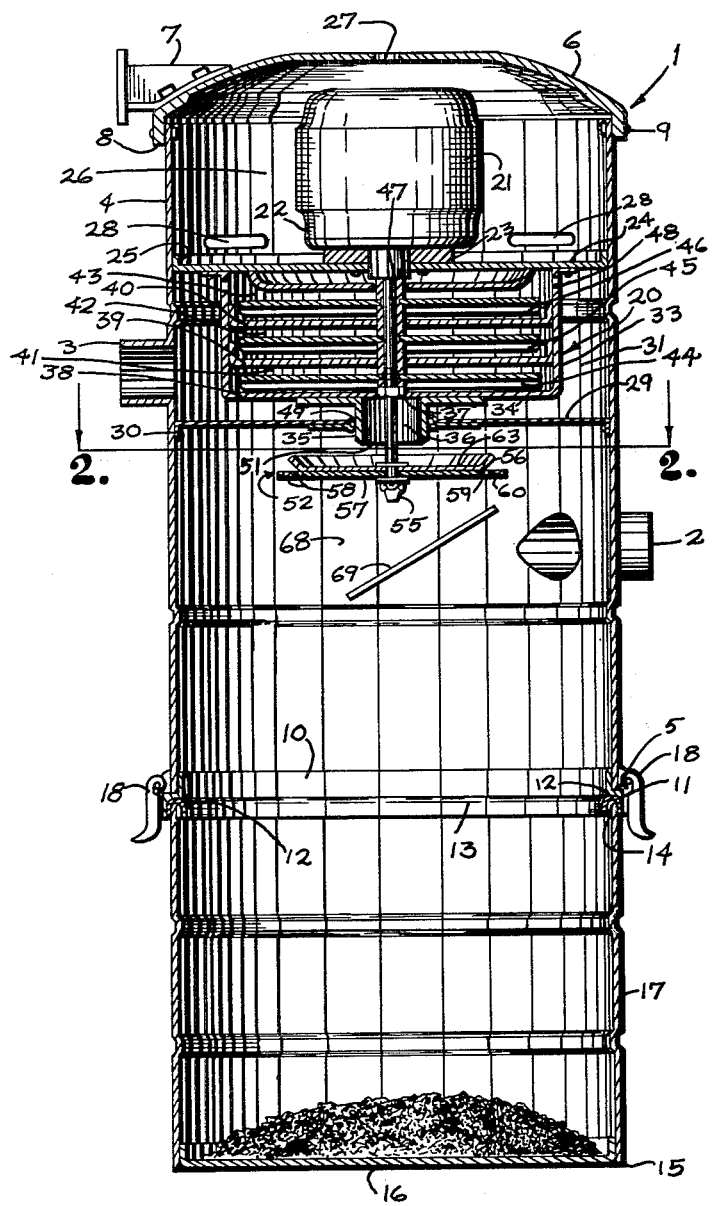
FIG. 1 is a vertical sectional view through a combined suction-producing, dirt separating and collecting unit for use in central cleaning systems.
Figure 2:
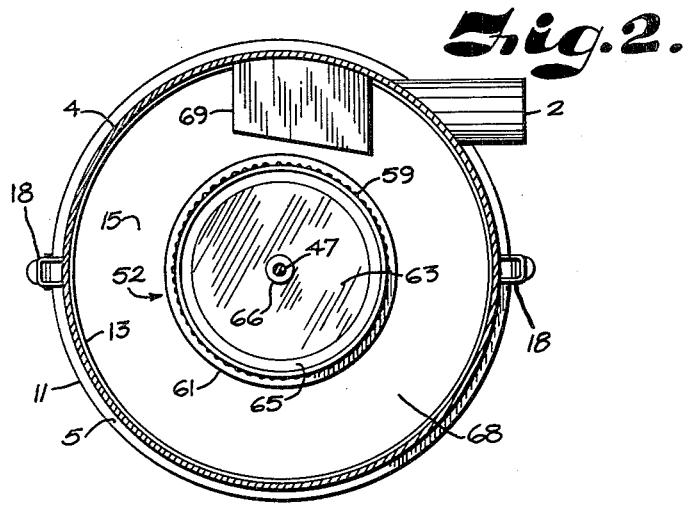
FIG. 2 is a transverse sectional view through the separator on the line 2—2, FIG. 1.
Figure 3:
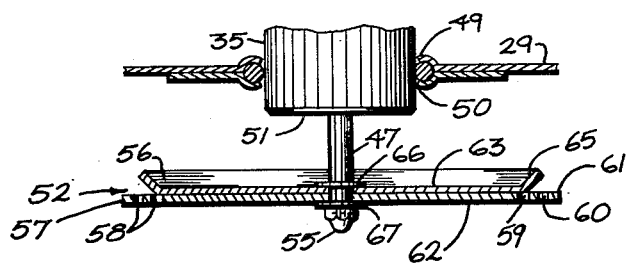
FIG. 3 is an enlarged detail sectional view through the rotor and passage to the suction apparatus.
Figure 4:
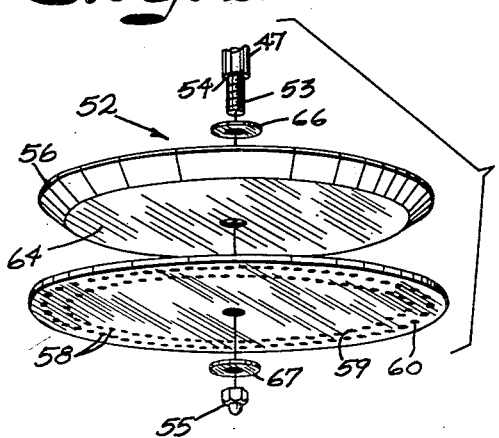
FIG. 4 is a disassembled perspective view of the members of the small particle separator rotor.

Referring more in detail to the drawings:

1 generally designates a combined suction-producing, dirt separating and collecting unit adapted to be used in a central cleaning system of a building wherein ducts (not shown) extend from suction cleaning equipment connections in various rooms through walls of the building and are suitably connected in communicating relation with an inlet 2 for delivery of dirt, dust and other material to the unit 1 as later described. The unit 1 has an air outlet 3 suitably connected to a duct (not shown) for discharge of air exteriorly of the building. The combined suction-producing, dirt separating and collecting unit 1 includes a preferably cylindrical casing 4 of suitable metal open at its bottom 5 and closed at its upper end by a top wall or cover 6.

It is preferable that the cover 6 be of strong wall construction whereby the unit is supported in suspended relation therefrom and that a bracket or other mounting member 7 extend from said cover and be adapted to be secured to a wall or the like whereby the unit is spaced from walls, ceiling and floor of the space in which it is positioned. However, it is to be understood that the unit 1 may be supported in any suitable manner that will permit access to the bottom portion thereof.

The cover member 6 is suitably secured to the upper portion of the cylindrical casing 4 as by flanges 8 and fastening devices 9. The lower end or bottom portion 5 of said casing has a reinforcing peripheral ring 10 suitably secured thereto with an offset depending peripheral flange 11 forming a shoulder 12 adapted to be engaged by a resilient seal member 13 on the upper edge 14 of a cylindrical dust collecting pan or receptacle 15 adapted to be detachably connected to the lower end of the casing 4 in closing relation thereto. The pan or receptacle 15 has a bottom wall 16 suitably secured to the cylindrical side wall 17 to form a pan of large capacity and substantial depth. A plurality of suitable fastening devices 18 are arranged around the lower end of the casing 4 and the upper end of the wall 17 for cooperation is removably securing the pan 15 to the casing 4 whereby said pan substantially forms a downward extension of said casing 4.

A suitable suction pump apparatus 20 is arranged in the upper end of the wall 17 for cooperation in removing 21 arranged substantially axially of said casing. The lower end 22 of said motor is suitably connected to a plate 23 carried by a horizontal or transverse wall or partition 24 which has a peripheral flange 25 suitably secured to the shell 4 whereby the shell 4, cover plate 6 and wall 24 cooperate to define a motor chamber 26. The cover member 6 preferably has an opening 27 therein for movement of air to the motor for cooling same, said air being discharged through apertures 28 in the shell 4 above the wall 24 whereby the motor is cooled by circulation of air independently of the air drawn through the cleaning apparatus.

A second horizontal or transverse wall or partition 29 has a peripheral flange 30 suitably secured to the shell 4 in downwardly spaced relation to the wall 24 whereby the shell and walls 24 and 29 define a chamber 31 in which a centrifugal suction pump 20 is located. In the structure illustrated, the pump 20 is of the three-stage type having a housing 33 with a lower wall 34 thereof having a tubular axial extension 35 defining a passage 36 communicating with an inlet opening 37 with the first stage 38 of said pump. The pump housing has spaced partitions 39 and 40 cooperating with the top and bottom walls of the pump to define pump chambers 41, 42 and 43, in which are located impellers 44, 45 and 46 respectively carried on a motor shaft 47 whereby operation of the motor 21 drives the impellers and draws air through the passage 36 and discharges the air from the pump through outlets 48 into the chamber 31. The outlet or air discharge connection 3 has communication with the chamber 31 whereby the air discharged from the pump passes through the connection 3 to an air discharge duct (not shown). The tubular member 35 extends through an opening 49 in the wall 29 with the marginal edge defining said opening being provided with a resilient seal member 50 which engages said tube 35 to form a seal between said wall 29 and the tubular member 35. The lower end of the tube 35 terminates in an open end 51 for the passage 36 that leads to the suction pump 20.

The tubular member 35 is arranged whereby the motor shaft 47 extends axially through the passage 36 and downwardly from the inlet opening 51 thereof and carries a small particle separator rotor 52 on the lower end thereof.

In the structure illustrated, the motor shaft 47 has a threaded lower end portion 53 of reduced size terminating in a shoulder 54 against which a rotor portion engages with the rotor being secured on the shaft by means of a member such as a nut 55 threaded on the portion 53.

The rotor 52 consists of two disc-like members 56 and 57 secured in face-to-face relation with spaced peripheral portions or diverging flanges for directing particles and air therefrom. The disc member 57 consists of a flat planar circular member with a plurality of circular rows of circumferentially spaced holes 58. In the illustrated structure, the holes 58 are arranged in radially spaced rows 59 and 60, said holes extending through the disc member which has an upper face 61 and lower face 62. The disc member 56 has a flat planar portion 63 with a lower face 64 adapted to engage the upper face 61 of the disc member 57. The flat disc portion 63 terminates in partially covering relation to the holes in the row 59 of the disc 57 in an upwardly and outwardly inclined flange 65. In the structure illustrated, the periphery of the disc portion 63 of the member 56 extends outwardly whereby the peripheral portion thereof covers approximately one-half of the holes in the row 59. The periphery of the upwardly and outwardly inclined flange 65 is preferably smaller than that of the disc 57, preferably extending to the same radial dimension as the outer limits of the holes in the row 60 of the disc 57. As an example, the disc members may be of sheet material such as metal or the like and in the nature of 1/32-inch thick and with an air passage 36 having a diameter of approximately 2 1/4 inches the disc 57 may be approximately 6 1/2 inches in the outside diameter with the holes 58 approximately 3/16-inch with those in the row 59 on a 5 3/8 inch diameter and those in the row 60 on a diameter of 6 inches, said holes in the rows being circumferentially spaced in the nature of 5/16 inch, and the disc 56 would have a diameter of the planar portion 63 in the nature of 5 1/2 inches with the outer periphery of the flange portion 65 having a diameter of approximately 6 1/4 inches. The outward inclination, or in other words the included angle between the outer face of the flange 65 and the upper face 61 of the disc 57, is preferably in the nature of 30 degrees, with the periphery of the flange 65 preferably in the plane spaced in the nature of 3/4 inch below the open end 51 of the tubular member 35. In the structure illustrated, washers 66 and 67 are placed between the disc 56 and the shoulder 54 and between the disc 57 and the nut 55, but they are clamped tightly so that the disc members form a rotor that rotates with the shaft 47.

The inlet connection 2 of the separator is arranged generally tangentially to discharge in the upper portion of the separator chamber 68. A baffle 69 is arranged in said chamber and secured to the wall 4 to direct the incoming air downwardly toward the receptacle 15 whereby said incoming air moves circumferentially and downwardly. The baffle 69 and the inlet connection 2 are preferably below the rotor 52.

In operating a cleaning system having a combined suction-producing, dirt separating and collecting unit constructed as illustrated and described, and with the inlet connection 2 connected to ducts leading to various rooms of a building, and a discharge duct connection 3 connected with ducts leading to the exterior of a building, a suitable cleaning implement is connected to the duct in the room to be cleaned and then the motor 21 is energized to drive the suction pump 20 and rotor 52, the suction pump creating an air flow therethrough and providing a suction at the cleaning implement whereby dirt and air are drawn through the implement and the ducts to the connection 2 and then the dirt-laden air enters the unit 1 in the chamber 68 and is directed downwardly and centrifugally in a whirl chamber portion of the separator and dirt collecting unit whereby heavier particles of dirt and the like drop into the pan 15 and collect on the bottom 16. The air moves inwardly toward the axial center of the chamber 68 and then upwardly around the rotor toward the inlet opening 51 of the passage 36. The row 59 of holes 58 creates a downward and outward turbulence of air and the outer row 60 of holes 59 creates an air turbulence with air moving through the holes 58 against the outer surface of the flange 65 forming a centrifugal action of the air whereby the smaller particles are directed outwardly toward the wall 4, with the air relieved of said particles still moving circumferentially and inwardly over the disc portion 56 to the inlet 51 of the passage 36 through which it passes to the suction pump 20 and is discharged through the openings 48 to the chamber 31 and then through the outlet connection 3 and discharge duct to the exterior of the building. The positive rotation of the rotor 52 creates an air turbulence that small particles and also large lightweight particles are thrown outwardly to settle through the circumferentially traveling inlet air to the pan 15.

It is found that this operation eliminates the possibility of material stopping the air flow and also maintains efficient operation with substantially no dirt being carried through the suction pump. The apparatus needs to be serviced only when a large quantity of dirt and the like is collected in the pan 15 at which time the fastening devices 18 are released and the pan removed and dumped and then resecured to the bottom of the shell 4, and the unit is again ready for cleaning operations.

It is to be understood that while I have illustrated and described one form of my invention, it is not to be limited to the specific form or arrangement of parts herein described and shown except insofar as such limitations are included in the claims.

What I claim and desire to secure by Letters Patent is:
1. A dirt separator for suction cleaners comprising,
 (a) a substantially cylindrical casing having a separable dirt-collecting receptacle in the lower portion thereof for collecting dirt from dirt-laden air entering said casing,
 (b) a suction pump means mounted in the upper portion of the casing, said suction pump means having an inlet duct extending downwardly therefrom,
 (c) an outlet duct communicating with said suction pump means,
 (d) motor means driving said suction pump means,
 (e) a shaft on said suction pump means and operable thereby, said shaft extending axially downwardly through said inlet duct,
 (f) a rotor fixed on said shaft in downwardly spaced relation to said inlet duct, said rotor having a planar disc portion normal to the axis of said shaft and annular flange portions at the periphery of said planar disc portion and in outwardly diverging relation with one flange portion in the plane of the disc portion and the other inclined upwardly and outwardly thereof,
 (g) and means defining an inlet passage into said casing,
 (h) said rotor being adjacent the suction pump inlet duct and in the path of air moving thereto in response to operation of the suction pump means drawing air through the casing inlet so that as the air moves toward the suction pump inlet duct the rotor effects a centrifugal turbulence moving small particles outwardly for gravitational settlement to the receptacle, the air then moving through the inlet duct to the suction pump means which discharges said air through the outlet duct.
2. A dirt separator for suction cleaners as set forth in claim 1 wherein said one flange portion of the rotor has a circular row of closely spaced holes therethrough arranged radially inwardly from the periphery thereof and substantially below the periphery of the other flange portion.
3. A dirt separator for suction cleaners comprising,
 (a) a substantially cylindrical casing having a closed upper end and an open lower end,

(b) a separable dirt-collecting receptacle closing said lower end of the casing for collecting dirt from dirt-laden air entering said casing,
(c) a suction pump means having a inlet duct extending downwardly therefrom,
(d) an outlet duct communicating with said suction pump means whereby operation of the suction pump means draws air through said inlet duct and discharges said air through said outlet duct,
(e) a shaft rotatably supported and extending axially downwardly through said inlet duct,
(f) a motor means drivingly connected to the suction pump means for operating same and rotating said shaft,
(g) a rotor fixed on said shaft in downwardly spaced relation to said inlet duct, said rotor having two planar disc portions in face-to-face relation and normal to the axis of said shaft,
(h) the lowermost disc portion having a coplanar outwardly extending annular flange portion at the periphery thereof,
(i) the upper disc portion having an outwardly extending annular flange portion at the periphery of said upper disc portion and inclined upwardly and outwardly relative to the flange portion on the lower disc portion, said inclined flange portion having a periphery spaced radially inwardly relative to the periphery of the flange portion on the lower disc,
(j) means defining an inlet passage into said casing directed substantially tangentially thereof,
(k) and a baffle fixed in said casing adjacent said inlet passage defining means and in the path of air therefrom and inclined downwardly relative thereto to direct incoming air downwardly in said casing for circumferential and gravitational movement and settlement of heavier than air particles to the receptacle, said rotor being rotated at high speed and causing an outward centrifugal air turbulence to separate all particles from the airstream passing thereby to the inlet of the suction pump.

4. A dirt separator for suction cleaners as set forth in claim 3 wherein the flange portion on the lower disc portion of the rotor has a circular row of closely spaced holes therethrough arranged radially inwardly of the periphery of said flange and substantially below the periphery of the inclined flange on the upper disc portion.

5. A dirt separator for suction cleaners as set forth in claim 3 wherein the flange portion on the lower disc portion of the rotor has a first circular row of closely spaced holes therethrough substantially below the outer periphery of the inclined flange and a second circular row of closely spaced holes therethrough radially inwardly of said first circular row and adjacent and outwardly of the planar portion of the upper disc portion.

6. In a dirt separator for suction cleaners,
(a) a suction pump, said suction pump having an air inlet duct extending therefrom,
(b) a shaft rotatably mounted and extending axially through said inlet duct,
(c) a rotor fixed on said shaft in spaced relation to said inlet duct and in the airstream passing thereto, said rotor having a planar disc portion normal to the axis of said shaft and an annular flange portion departing from the planar disc portion in outwardly diverging relation to the planar disc portion adjacent the periphery thereof,
(d) the planar disc portion having a plurality of circularly spaced openings in the portion between the periphery thereof and the departure of the annular flange portion therefrom,
(e) and means operatively connected with the suction pump and shaft to rotate same at high speed to provide a centrifugal separating action of small particles from the airstream passing to the inlet duct.

7. In a dirt separator for suction cleaners as defined in claim 6 wherein the rotor has two planar disc portions in face-to-face contact with the annular flange being on the disc portion adjacent said inlet duct, the other disc portion being larger in diameter whereby the periphery thereof is spaced radially outwardly of the periphery of said annular flange with said openings being a circular row of closely spaced holes through said other disc portion adjacent to and radially inwardly of the periphery of said annular flange.

8. In a dirt separator for suction cleaners as defined in claim 7 wherein said other disc portion has two circular rows of closely spaced holes therethrough with the second row being adjacent and radially outwardly of the planar portion of the disc portion that is adjacent the inlet duct.

References Cited by the Examiner
UNITED STATES PATENTS

| | | | |
|---|---|---|---|
| 1,103,548 | 7/14 | Spencer | 55—429 XR |
| 2,244,102 | 6/41 | Elder | 55—406 XR |
| 2,314,986 | 3/43 | Johnson | 55—407 |
| 2,494,981 | 1/50 | Acheson | 55—337 XR |
| 2,991,844 | 7/61 | Nomar | 55—408 XR |
| 3,032,954 | 5/62 | Racklyeft | 55—400 XR |

FOREIGN PATENTS 1,076,475   4/54   France.

REUBEN FRIEDMAN, *Primary Examiner.*
HARRY B. THORNTON, *Examiner.*